MEANS FOR APPLYING INFORMATION TO DATA-STORING ELEMENTS

Filed June 12, 1963 3 Sheets-Sheet 1

INVENTOR.
L. ALLAN CROSS, Jr.
BY Albert Sperry

Jan. 25, 1966 L. A. CROSS, JR 3,231,186

MEANS FOR APPLYING INFORMATION TO DATA-STORING ELEMENTS

Filed June 12, 1963 3 Sheets-Sheet 2

INVENTOR
L. ALLAN CROSS, Jr.
BY Albert Sperry

Jan. 25, 1966 L. A. CROSS, JR 3,231,186

MEANS FOR APPLYING INFORMATION TO DATA-STORING ELEMENTS

Filed June 12, 1963 3 Sheets-Sheet 3

INVENTOR.
L. ALLAN CROSS Jr.
BY
Albert Sperry.

United States Patent Office 3,231,186
Patented Jan. 25, 1966

3,231,186
MEANS FOR APPLYING INFORMATION TO DATA-STORING ELEMENTS

Laurence Allan Cross, Jr., Lambertville, N.J., assignor to Automation Engineers, Inc., Trenton, N.J., a corporation of New Jersey Filed June 12, 1963, Ser. No. 287,275
7 Claims. (Cl. 234—48)

This invention relates to methods and means for the selective punching of holes or notches in cards or for printing, embossing, or otherwise applying information to cards or other information-containing elements for the purpose of coding information into the cards which later may be read, processed, or used to select the card by various business machines, keysort and needlesort techniques, or other data processing equipment. The invention further may be employed for punching holes in papers or cards for the purpose of binding them together.

It has been common practice heretofore to punch holes or notches representing numbers, letters or characters in or along an edge of a card or tape by successively repositioning the punching mechanism or the card relative to each other following each punching operation. Thus, for example, input signals representing a number or letter have been received and punched in a card or tape, after which the card has been advanced or moved to another position, and the next input signal utilized to punch other holes in the card. This successive punching and repositioning was continued until all the required information was punched in the card or other information-containing element.

Methods and equipment required to perform such operations have been relatively expensive and complicated and have made no simple provision for correction or elimination of an error in the punching of any number or other character in the tape or card being punched.

In accordance with the present invention, it is possible to store a plurality of information elements within the punching mechanism and then to simultaneously punch all such stored elements into a card or information-containing medium whereby the need for successive repositioning of the card or punching mechanism in order to punch each element of information is eliminated. In many applications of the present invention, a significant advantage is attained in that the input and storage of new information to the punching mechanism can be accomplished simultaneously with the changing of the cards to be punched.

The cards or information-containing elements are preferably of the type shown and described in copending application Serial No. 285,336, filed June 4, 1963, and the cards as punched by this invention can be used in the card sorting and handling equipment of the type shown and described in copending application Serial No. 272,-485, filed April 11, 1963. However, the punched cards also can be employed in keysorting or needlesorting card systems, or in any other device or system that uses holes or notches in the edge of a card to handle and process the said card.

The means and methods of the herein described invention permit convenient adaptation of automatic feeding techniques for cards or other information-containing media to and from the said punching mechanism. Moreover, the input of information to the punching mechanism may be automatic, as when the equipment is intercoupled to other data processing machines, such as card or tape readers, whereby input impulses to the storage facility of the punching mechanism may be automatically provided by the intercoupled data processing machine.

Accordingly, the principal objects of the present invention are to provide novel means and methods for receiving and storing information or data within a punching mechanism in such a manner that punching of a programmed group of information elements can be simultaneously accomplished on a card or other information-containing media, and to provide equipment capable of operation to cancel or eliminate errors occurring during the storing of data or information.

These and other objects, features, and advantages of the present invention will appear from the following description thereof wherein reference is made to the accompanying drawings, which illustrate a typical form of the invention, for the purpose of indicating the nature and principle of the invention, but without intending to limit the invention thereto.

Figures 1, 2:
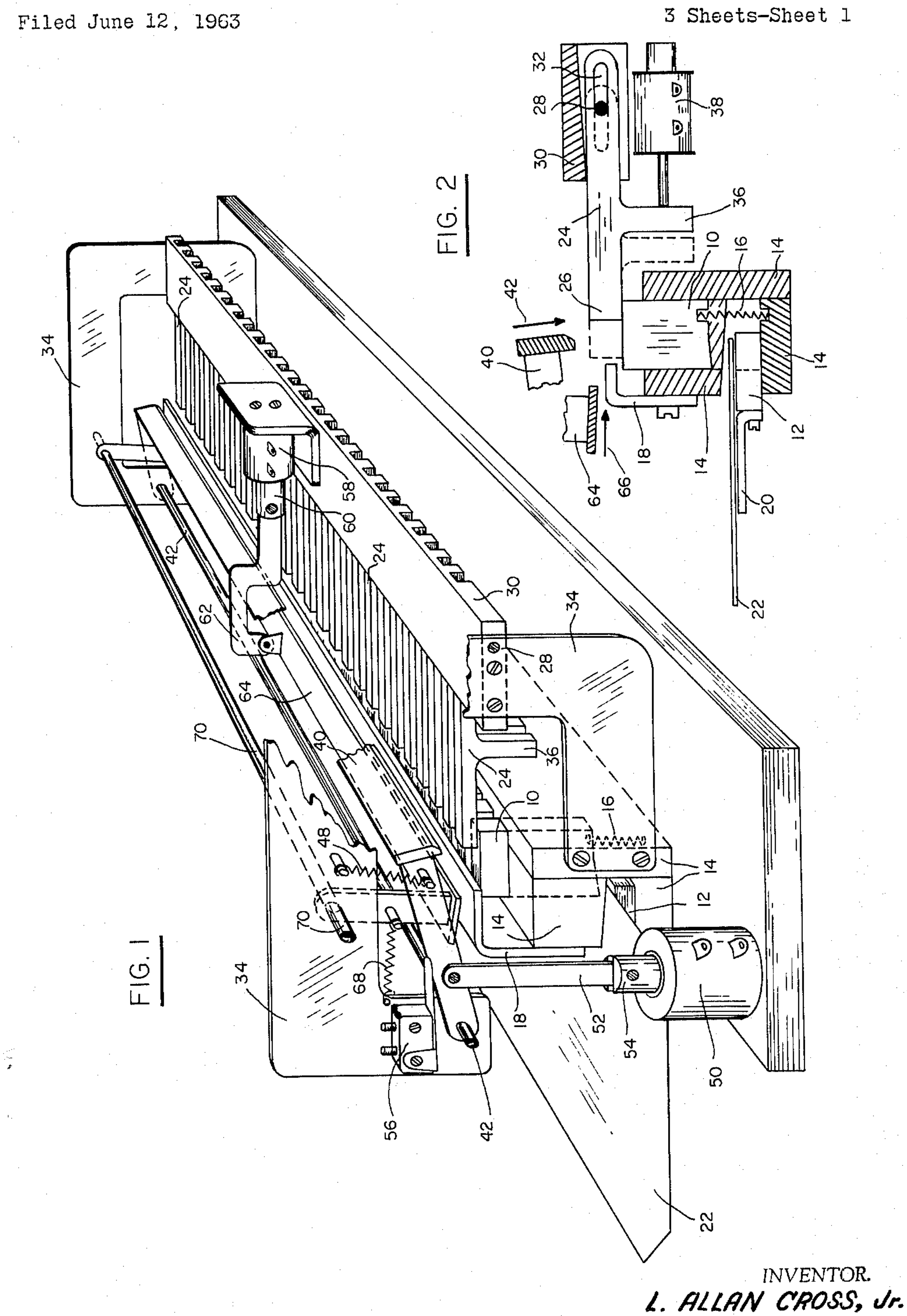
FIG. 1 is a perspective illustrating a typical form of equipment embodying the principles of the present invention.
FIG. 2 is a transverse sectional view of the major elements of the equipment shown in FIG. 1.

The mechanical linkage illustrated in FIGS. 1 and 2 is typical of elements which may be used in equipment embodying the present invention and illustrates the principle employed in predetermining punching positions and the storage of input information prior to the simultaneous punching of all selected punch positions. However, any other mechanical means that conforms to the principle of operation herein described will conform to this invention.

In that form of the invention chosen for purpose of illustration in FIGS. 1 and 2, the punching mechanism embodies a plurality of selectively operable members which, as shown, include a punch pin 10 for each position that may be punched along an edge of a card 22 or other information-containing medium. Each punch pin 10 is designed to match with its relative configuration in the die block 12 so that when the punch pin 10 is engaged with the die block 12, a cutting, shearing, printing, or embossing action will be accomplished on a card 22 positioned between the said punch and die block. Each punch pin 10 is positioned within a guide block assembly 14 for the purpose of guiding the punch pins during their movement. The guide block assembly 14 also may serve as a mounting base for die block 12 and other components as shown. Spring means 16 urge each punch pin 10 upward and out of engagement with die block 12; whereas, punch pin retainer means 18 mounted on guide block assembly 14 limit the upward travel of all punch pins under the action of the springs 16. A card guide 20 serves to position a card 22 or other information-carrying element in a predetermined position preparatory to punching thereof. In the preferred form of the invention illustrated, the pins 10 are arranged side by side in a row for punching the edge portion of the card 22.

For each of punch pins 10, there is a selecting means such as an interposer slug 24 which is positioned so that one side edge of the left end 26 of the slug 24, as seen in FIG. 2, extends over and is directly in contact with the right portion of the top surface of the punch pin 10. The opposite end of each slug 24 has an oblong hole configuration 32 therein and a rod or shaft 28 runs transversely through the holes 32 in all slugs 24. The ends of the shaft 28 are secured to the slug guide block 30 so that shaft 28 will limit the horizontal movement of the slugs 24 relative to the punch pins 10. Thus, the left end 26 of interposer slug 24 can move horizontally to the left to cover a greater portion of the top surface of punch pin 10, as shown by the dotted lines in FIG. 2, or can move to the right to the retraced position, shown in full lines in FIG. 2. The slugs 24 are held against undesired upward movement by a slug guide block 30 mounted on the guide block 14 by frames 34. However, there is a sufficient clearance between the right top end of slug 24 and the bottom of guide block 30 to permit the left end 26 of slug 24 to move downward with punch pin 10 as it engages with the die block 12 to punch the card 22. The assembly thus provided is mounted in such a manner that the top of all interposer slugs 24 are normally in contact with the slug guide block 30 and the left end 26 of each slug 24 is in contact with its respective punch pin 10, all the top surfaces of the head portions of the pins being in a generally common plane. Thus, these points of contact provide frictional resistance to the horizontal movement of slugs 24 or other selecting means employed, and tend to hold the same in any position to which they may be moved.

The ability to store information within the punching mechanism is accomplished by moving predetermined selecting means or slugs 24 to the left and into positions wherein the ends 26 thereof extend farther over selected punch pins 10. For this purpose, input information in the form of signal impulses or the like is transmitted to the selecting means by mechanism such as the downwardly extending member 36 carried by the slug 24 to cause the said slug to move horizontally to the left, as shown in the dotted lines in FIG. 2. The impulses utilized to actuate any slug 24 may originate from solenoids 38, one of which is associated with each of the slugs 24, or the slugs may be moved by other actuating means positioned adjacent to the lower member 36. The impulses utilized as actuating means also may be derived from a signal code translator as described in copending application Serial No. 280,964 filed May 16, 1963, or from mechanical linkage or the action of some other machine to which this punching mechanism is attached or intercoupled. In this way, the various slugs 24 may be selectively moved to the left, as seen in FIG. 2, so as to extend farther over selected punch pins 10 as sequential impulses are received. The selection of the slugs to be actuated may be continued until all or a predetermined portion of the input information, such as a multi-digit number or word or other multi-element character, is stored in the machine.

After the desired number, word or other information has been thus stored, the simultaneous operation of all preselected punch pins 10, over which slugs 24 have been moved to the left, is effected by a suitable device, such as the punch bar 40. The punch bar is movable downward, as shown by arrow 42 in FIG. 2, in a path generally normal to the common plane of the top surfaces of the pins 10 and extending across the upper side edges of the selected, operatively positioned slugs, so as to engage the left ends 26 of the selected and extended slugs 24 and to actuate selected punch pins 10. The selected punch pins then are moved downward against the action of the springs 16 and into positions wherein they engage die block 12. The card 22 positioned between the punch pins and die block will thus be punched in each of those positions determined by the actuating of the various solenoids 38 in response to input signals impressed on the equipment. Nonselected punch pins 10, for which the slugs 24 have not been extended to the left, are not in position to be engaged by the punch bar 40 on downward movement thereof. Moreover, since punch bar 40 does not move down far enough to directly contact the punch pins 10, the nonselected punch pins 10 will not be activated and no punching of the card 22 will be accomplished in any nonselected position. As a result, the card 22 or any tape or other information-receiving element employed will have openings, notches, imprinting, embossing, or the like applied thereto in selected positions determined by the input signal impressed on the equipment and stored therein by the slugs 24.

The punch bar 40 is pivotally mounted for movement about a shaft 42 mounted on the frames 34. Spring means 48 tend to hold punch bar 40 in an upper inactive position, but are yieldable to permit downward movement of the punch bar upon movement of operating means, such as the punch actuating solenoid 50. The solenoid 50 is connected to the punch bar 40 by linkage 52; whereas, its plunger 54 is normally held in the upper de-energized position by spring 48. In operation, upon completion of a cycle of input impulses, the solenoid 50 is actuated causing the card 22 to be punched in the preselected positions. Following punching, the punch actuating solenoid 50 is automatically de-energized and spring 48 causes the punch bar 40, linkage 52 and solenoid plunger 54 to return to their upper idle position, as shown in FIG. 1. At the same time, the punch pin springs 16 force the previously selected and actuated punch pins 10 upward out of die block 12 and back to their original idle position.

The upward movement of the punch bar 40 also serves to actuate a switch 56 positioned so that it will be actuated by the return movement of punch bar 40. The switch 56 when actuated serves to cause a slug restoring solenoid 58 to be energized.

The slug restoring bar 64 is pivotally movable about a shaft 70 mounted on frames 34. A spring 68 tends to hold the slug restoring bar 64 in the left or inoperative position, as seen in FIG. 2, and also serves to hold the plunger 60 of a slug restoring solenoid 58 in the left or de-energized position. The plunger 60 of solenoid 58 is connected by a link 62 to slug restoring bar 64 so as to move the slug restoring bar 64 to the right, as shown by arrow 66 in FIG. 2, when solenoid 58 is energized in a path generally normal to that of bar 40, thus to engage the end edges of the selected interposers or slugs 24. In this way, the slug restoring bars serves to restore all previously selected and positioned interposer slugs 24 to their original idle position. Upon completion of this restoring motion, solenoid 58 is deenergized and spring 68 serves to return the restoring bar 64 to the idle position so that the equipment is in readiness to receive a new series of signals and to punch another card or portion of a card, tape, or other information-storing element.

The construction thus described and shown is further capable of operation to correct an error occurring in the receipt or utilization of a signal, as exemplified by those cases wherein one or more wrong interposer slugs 24 become prepositioned over punch pins 10. For this purpose, means are provided for effecting the operation of the slug restoring solenoid 58 alone without operating the punch actuating solenoid 50. When the slug restoring solenoid is thus actuated, the interposer slugs are returned to the right and to their idle position, and the incorrect input information is removed from the storage facility of the mechanism without punching a card 22.

In operating the equipment shown in FIGS. 1 and 2, the card 22 or other element or member to be punched, printed, or embossed with desired information is positioned between the die block 12 and the punch pins 10 and in engagement with the card guide 20 so as to locate the card in a predetermined position for punching the edge portion of the card. The signal impulses for selectively actuating the interposer slugs 24 may be received from any suitable source, such as the signal translating equipment shown and described in copending application Serial No. 280,964. In any event, and however received, the input signals serve to selectively energize the solenoids 38 or to otherwise move predetermined selecting means or interposer slugs 24 located in those positions required to impart the desired information to the card 22 from their idle full line positions of FIG. 2 to their projected memory positions shown in dotted lines in FIG. 2. When thus selected and projected by the signal impulses, the interposer slugs have their left ends 26 located over the punch pins 10 in positions wherein they are engageable by an actuating device such as the punch bar 40 upon operation thereof. After such signals have been received and utilized in sufficient number to represent a multi-digit number, word, character, or portion of the information to be impressed on the card 22 or other information-carrying element, the punching equipment is caused to perform its cycle of punching movements to transfer the information stored by the interposer slugs 24 to the card 22.

Figure 3:
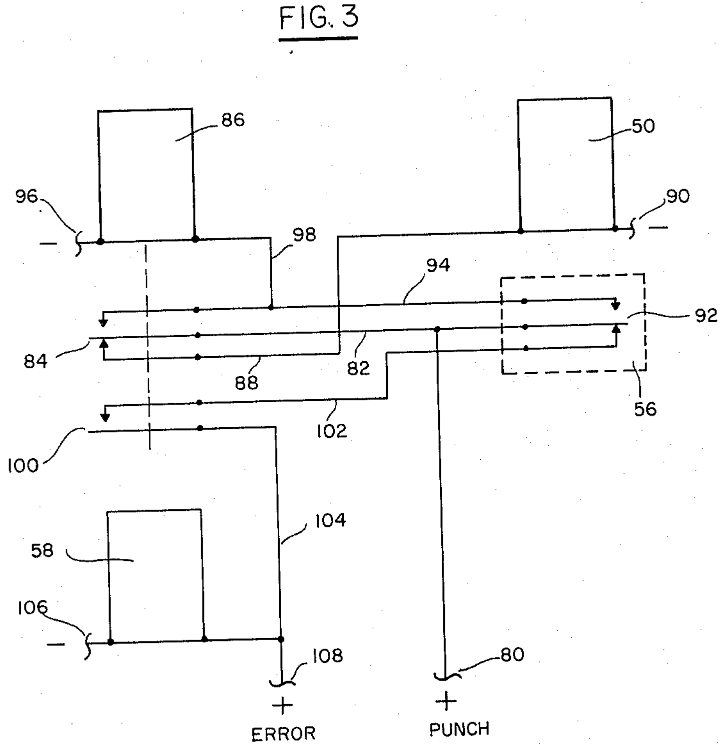
FIG. 3 is a wiring diagram illustrating a typical form of electrical circuitry which may be employed in actuating the equipment of FIGS. 1 and 2.
Figure 4:
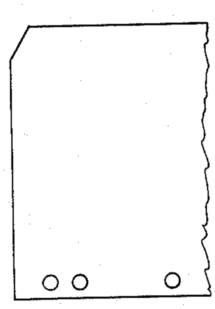
FIGS. 4, 5, 6 and 7 are illustrations of different types of holes and notches that can be punched by means of this equipment.
Figure 5:
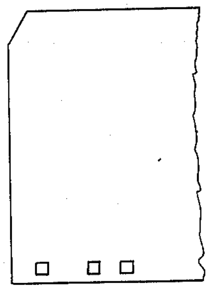
Figure 6:
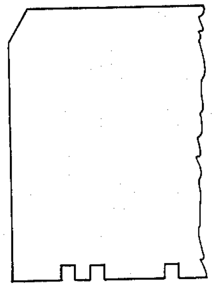
Figure 7:
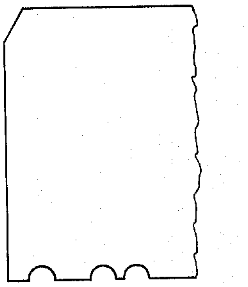

In order to control and assure the proper timing and sequence of the punching and slug restoring operations, as shown in FIGS. 1 and 2, a suitable control circuit, such as that shown in FIG. 3, may be employed. As there shown, a signal to initiate the punching cycle is received from a suitable source, as represented by the positive current source 80. However, it should be understood that the signal utilized to actuate the equipment may originate upon the conclusion of a predetermined number of signal impulses employed to actuate the interposer slugs 24 or as a manual keyboard switch entry or as an automatic signal originating from other equipment to which the punching mechanism of the present invention is attached or intercoupled. Current from the punching signal current source 80 flows through line 82, and the normally closed contact 84 associated with relay 86 to the line 88 and thence to punching solenoid 50 and to ground at 90. In this way, the punching solenoid 50 is energized and punch bar 40 is caused to actuate all preselected punch pins 10 to punch the card 22. The downward movement of punch bar 40 causes switch 56 to move switch arm 92 into engagement with its upper contact and thus permit current from input source 80 to flow through lines 94 and 98 to relay 86 and to ground 96. Thus, relay 86 will be energized and will serve to move switch contact 84 to its upper position which will serve to open the circuit to punching solenoid 50, causing punch bar 40 to return to its idle position. The switching of contact 84 will also provide a holding circuit from source 80 and line 82, through contact 84 and line 98 to keep relay 86 energized as long as there is punching cycle current input at 80. When punch bar 40 returns to its upper idle position, the switch arm 92 of switch 56 is returned to its lower normally closed position as shown in FIG. 3. However, since relay 86 will still be energized by current flowing through the holding circuit, the contact 100 controlled by relay 86 will remain closed. As a result, current will now flow from source 80 through contact arm 92 and the lower contact of switch 56, through line 102 and contact 100 to line 104 and slug restoring solenoid 58 and to ground 106. The slug restoring solenoid 58 is thereby actuated to cause the slug restoring bar 64 to return all preselected slugs to their normal inoperative position. When the punching impulse and current is removed from 80, the restoring solenoid 58 and the relay 86 are both de-energized, and the circuitry returns to the normal idle condition.

As shown in FIG. 3, an error control impulse or signal current is supplied at 108 and may originate as a manual keyboard switch entry or as an automatic signal originating from other equipment to which the punching mechanism is connected or intercoupled. From 108 the error control current impulse passes directly to the slug restoring solenoid 58 and thence to ground at 106 whereby only the slug restoring operation is accomplished without any punching operation.

As shown in FIGS. 4, 5, 6 and 7, the punch mechanism is capable of edge punching any size, shape, and configuration of hole or notch into the edge of a card or other media to be punched. However, the punch elements 10 may serve to print, emboss or otherwise impart information to the card or element acted thereon. Moreover, if desired, and as an auxiliary usage of mechanism embodying the present invention, it may be used to punch holes in cards or papers for the purpose of binding them together or for any other purpose.

Figure 8:
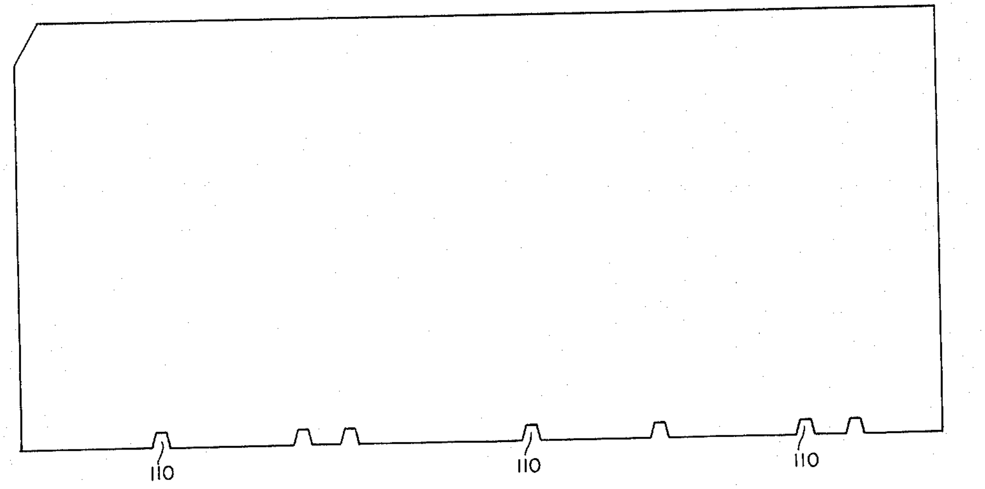
FIG. 8 illustrates a card as punched along one edge, and shows a preferred shape and configuration of edge notch in the said card.

FIG. 8 illustrates a punched card of the type referred to in copending application Serial No. 285,336 wherein notches 110 are arranged in a predetermined manner along one edge of the card to represent a particular code. The particular notch 110 in FIG. 8 is an isosceles trapezoid, wherein the top of the notch is smaller than its opening, and the sides slope in the opposite direction of each other. Such a notch 110 is preferred and desirable for usage to prevent interlocking of the cards when they are slid one across the face of another as is common practice in many data processing machines.

While certain typical and preferred methods and constructions embodying the present invention have been described above and shown in the drawings, these embodiments are to be understood to be illustrative only and are not intended to limit the scope of the invention, since the invention is capable of variation and change to meet many different conditions and requirements. Such modifications are, therefore, contemplated and come within the spirit and scope of this invention as described in the appended claims.

I claim:

1. Equipment for applying information to a data-storing element comprising:

(a) means for locating an element to which data is to be applied in a predetermined position in said equipment;

(b) a plurality of selectively operable members movable simultaneously in a first direction into engagement with an element located in said predetermined position to apply said data;

(c) a plurality of selecting means individual to the several members and movable in a second direction from a normal rest position to select which of said members are to be moved into engagement with said element;

(d) an actuating device common to all of said selecting means and movable generally in said first direction to move all the members selected by said means simultaneously into engagement with said element; and (e) restoring means common to all of said selecting means and movable in a third direction generally opposite to the direction of movement of the selecting means to return said selecting means to the normal, rest position thereof, said restoring means, at the option of a user, being at times movable in said third direction after said movement of the actuating device, and being movable at other times without the prior movement of the actuating device.

2. Equipment as in claim 1 wherein the direction of movement of the actuating device and of said members is generally normal to the directions in which the selecting and restoring means are moved.

3. Equipment as in claim 2 wherein the selecting means and said members are arranged in parallel, straight rows, said actuating device and said restoring means each including a bar the length of which is in parallelism with, and is at least coextensive with, said rows.

4. Equipment as in claim 3 wherein said bars of the restoring means and actuating device are pivoted to swing about spaced axes paralleling the lengths of the bars.

5. Equipment for applying information to a data-storing element comprising:

(a) means for locating an element to which data is to be applied in a predetermined position in said equipment;

(b) a plurality of pins for applying said data, said pins occupying an area adjacent said element and being movable independently of one another from normally retracted positions along parallel paths to data-applying positions in respect to said element, the several pins having head portions disposed, in the retracted positions of the pins, in a common plane normal to the paths of movement of the pins;

(c) a series of interposers, one for each pin, extending adjacent said area, each interposer being movable from a normally retracted position to an operative position in which, at one of its ends, it has one side edge overlying its associated pin in contact with the head portion thereof;

(d) a pin-actuating bar common to all of said pins and interposers and movable in the same general direction as said pins, said bar moving in a path that extends across the other side edges of the operatively positioned interposers to drive to a data-applying position the pins underlying said operatively positioned interposers; and (e) an interposer restoring bar common to all of said interposers and movable in a path approximately parallel to said plane and generally normal to that of the pin-actuating bar, the path of said restoring bar extending across the end edges of the operatively positioned interposers so as to return the interposers to the normal position thereof in response to said movement of the second named bar.

6. Equipment as in claim 5 further including solenoids individual to the several interposers and arranged to move the same from their retracted positions when energized; and solenoids connected to the pin-actuating and interposer-restoring bars respectively for moving the same to their operative positions when energized, said solenoids being electrically related for normal energization first, of selected ones of the solenoids connected to the interposers; second, of the solenoid connected to the pin-actuating bar; and third, of the solenoid connected to the interposer-restoring bar.

7. Equipment as in claim 6, further including means for, at the option of a user, energizing the solenoid connected to the interposer-restoring bar without prior energization of the solenoid connected to the pin-actuating bar.

References Cited by the Examiner

UNITED STATES PATENTS

| | | | |
|---|---|---|---|
| 1,780,610 | 11/1930 | Weinlich | 234—115 |
| 2,726,720 | 12/1955 | Martin | 234—111 |
| 2,859,816 | 11/1958 | MacNeill | 234—115 |
| 2,970,753 | 2/1961 | Lisinski | 234—115 |
| 3,051,376 | 8/1962 | Oldenburg | 234—115 |
| 3,104,805 | 9/1963 | Holicky | 234—115 |

WILLIAM W. DYER, Jr., *Primary Examiner.*

ANDREW R. JUHASZ, *Examiner.*